US011312208B2

(12) United States Patent
Sun et al.

(10) Patent No.: US 11,312,208 B2
(45) Date of Patent: Apr. 26, 2022

(54) ACTIVE THERMAL MANAGEMENT SYSTEM AND METHOD FOR FLOW CONTROL (71) Applicant: GM GLOBAL TECHNOLOGY OPERATIONS LLC, Detroit, MI (US)

(72) Inventors: Min Sun, Troy, MI (US); Yiran Hu, Shelby Township, MI (US); David E. Edwards, Rochester Hills, MI (US); Jun Chen, Novi, MI (US); Insu Chang, Troy, MI (US); Steven P. Moorman, Dexter, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 235 days.

(21) Appl. No.: 16/551,064

(22) Filed: Aug. 26, 2019

(65) Prior Publication Data
US 2021/0061063 A1 Mar. 4, 2021

(51) Int. Cl.
*B60H 1/00* (2006.01)
*F01P 7/16* (2006.01)
(52) U.S. Cl.
CPC ....... *B60H 1/00735* (2013.01); *B60H 1/0073* (2019.05); *F01P 7/16* (2013.01)
(58) Field of Classification Search
CPC ....... B60H 1/0073; B60H 1/00735; F01P 7/16
See application file for complete search history.

(56) References Cited

U.S. PATENT DOCUMENTS

| 4,161,929 A | 7/1979 | Nohira et al. |
| 5,101,786 A | 4/1992 | Kamio et al. |
| 5,706,780 A | 1/1998 | Shirakawa |
| 5,727,528 A | 3/1998 | Hori et al. |

(Continued)

FOREIGN PATENT DOCUMENTS

| CN | 1594846 A | 3/2005 |
| CN | 107664058 A | 2/2018 |

(Continued)

OTHER PUBLICATIONS

Servetto et al. (Oct. 8, 2018). Setup and validation of an integrated thermal model in GT-suite for heat rejection prediction. European GT Conference 2018.

(Continued)

*Primary Examiner* — Leonard R Leo
(74) *Attorney, Agent, or Firm* — Lorenz & Koph LLP (57) ABSTRACT

Systems and methods are provided for management of a thermal system. A system for thermal management includes a thermal system with fluid conduits. A sensor is disposed to monitor an input parameter state of the thermal system. An actuator is configured to vary a flow in the fluid conduits. A controller is configured to receive a signal representative of the input parameter state; process an actuator state through a flow model of the thermal system to obtain an existing flow in the fluid conduits; process the existing flow through a thermal model of the thermal system to determine an input that reduces an error between a desired parameter state and the input parameter state; process the input through an (Continued)

inverse flow model to convert the input to a desired actuator state; and position the actuator in the desired actuator state.

20 Claims, 5 Drawing Sheets

(56) References Cited

U.S. PATENT DOCUMENTS

| | | | |
|---|---|---|---|
| 5,775,293 | A | 7/1998 | Kresse |
| 5,921,219 | A | 7/1999 | Frohlich et al. |
| 6,014,955 | A | 1/2000 | Hosotani et al. |
| 6,155,230 | A | 12/2000 | Iwano et al. |
| 6,173,226 | B1 | 1/2001 | Yoshida |
| 6,276,333 | B1 | 8/2001 | Kazama et al. |
| 6,532,935 | B2 | 3/2003 | Ganser et al. |
| 6,606,981 | B2 | 8/2003 | Itoyama |
| 6,704,638 | B2 | 3/2004 | Livshiz et al. |
| 6,704,641 | B2 | 3/2004 | Tashiro et al. |
| 6,826,904 | B2 | 12/2004 | Miura |
| 6,840,215 | B1 | 1/2005 | Livshiz et al. |
| 6,953,024 | B2 | 10/2005 | Linna et al. |
| 6,993,901 | B2 | 2/2006 | Shirakawa |
| 7,016,779 | B2 | 3/2006 | Bowyer |
| 7,021,282 | B1 | 4/2006 | Livshiz et al. |
| 7,051,058 | B2 | 5/2006 | Wagner et al. |
| 7,222,012 | B2 | 5/2007 | Simon, Jr. |
| 7,235,034 | B2 | 6/2007 | Berglund et al. |
| 7,236,874 | B2 | 6/2007 | Ichihara |
| 7,274,986 | B1 | 9/2007 | Petridis et al. |
| 7,275,518 | B1 | 10/2007 | Gartner et al. |
| 7,356,403 | B2 | 4/2008 | Yoshioka et al. |
| 7,395,147 | B2 | 7/2008 | Livshiz et al. |
| 7,400,967 | B2 | 7/2008 | Ueno et al. |
| 7,433,775 | B2 | 10/2008 | Livshiz et al. |
| 7,441,544 | B2 | 10/2008 | Hagari |
| 7,546,196 | B2 | 6/2009 | Izumi et al. |
| 7,563,194 | B2 | 7/2009 | Murray |
| 7,614,384 | B2 | 11/2009 | Livshiz et al. |
| 7,698,048 | B2 | 4/2010 | Jung |
| 7,703,439 | B2 | 4/2010 | Russell et al. |
| 7,715,975 | B2 | 5/2010 | Yamaoka et al. |
| 7,775,195 | B2 | 8/2010 | Schondorf et al. |
| 7,777,439 | B2 | 8/2010 | Falkenstein |
| 7,813,869 | B2 | 10/2010 | Grichnik et al. |
| 7,885,756 | B2 | 2/2011 | Livshiz et al. |
| 7,941,260 | B2 | 5/2011 | Lee et al. |
| 7,949,459 | B2 | 5/2011 | Yoshikawa et al. |
| 7,967,720 | B2 | 6/2011 | Martin et al. |
| 7,967,729 | B2 | 6/2011 | Martin et al. |
| 7,975,668 | B2 | 7/2011 | Ramappan et al. |
| 7,980,221 | B2 | 7/2011 | Baur et al. |
| 8,010,272 | B2 | 8/2011 | Kuwahara et al. |
| 8,027,780 | B2 | 9/2011 | Whitney et al. |
| 8,041,487 | B2 | 10/2011 | Worthing et al. |
| 8,050,841 | B2 | 11/2011 | Costin et al. |
| 8,073,610 | B2 | 12/2011 | Heap et al. |
| 8,078,371 | B2 | 12/2011 | Cawthorne |
| 8,086,390 | B2 | 12/2011 | Whitney et al. |
| 8,103,425 | B2 | 1/2012 | Choi et al. |
| 8,103,428 | B2 | 1/2012 | Russ et al. |
| 8,116,954 | B2 | 2/2012 | Livshiz et al. |
| 8,121,763 | B2 | 2/2012 | Hou |
| 8,176,735 | B2 | 5/2012 | Komatsu |
| 8,181,627 | B2 | 5/2012 | Sharples et al. |
| 8,209,102 | B2 | 6/2012 | Wang et al. |
| 8,209,104 | B2 | 6/2012 | Soejima et al. |
| 8,219,304 | B2 | 7/2012 | Soma |
| 8,241,177 | B2 | 8/2012 | Doering et al. |
| 8,307,814 | B2 | 11/2012 | Leroy et al. |
| 8,316,828 | B2 | 11/2012 | Whitney et al. |
| 8,447,492 | B2 | 5/2013 | Watanabe et al. |
| 8,468,821 | B2 | 6/2013 | Liu et al. |
| 8,483,935 | B2 | 7/2013 | Whitney et al. |
| 8,527,120 | B2 | 9/2013 | Matthews et al. |
| 8,560,204 | B2 | 10/2013 | Simon et al. |
| 8,566,008 | B2 | 10/2013 | Soejima et al. |
| 8,593,806 | B2 | 11/2013 | Huang |
| 8,594,904 | B2 | 11/2013 | Livshiz et al. |
| 8,635,001 | B2 | 1/2014 | Doering et al. |
| 8,739,766 | B2 | 6/2014 | Jentz et al. |
| 8,744,716 | B2 | 6/2014 | Kar |
| 8,862,248 | B2 | 10/2014 | Yasui |
| 8,954,257 | B2 | 2/2015 | Livshiz et al. |
| 8,977,457 | B2 | 3/2015 | Robinette et al. |
| 9,031,766 | B2 | 5/2015 | DeLaSalle et al. |
| 9,062,631 | B2 | 6/2015 | Kinugawa et al. |
| 9,067,593 | B2 | 6/2015 | Dufford |
| 9,075,406 | B2 | 7/2015 | Nakada |
| 9,115,635 | B2 * | 8/2015 | Abou-Nasr ............. F01P 7/162 |
| 9,145,841 | B2 | 9/2015 | Miyazaki et al. |
| 9,175,622 | B2 | 11/2015 | Seiberlich et al. |
| 9,175,628 | B2 | 11/2015 | Livshiz et al. |
| 9,222,426 | B2 | 12/2015 | Rollinger et al. |
| 9,243,524 | B2 | 1/2016 | Whitney et al. |
| 9,328,671 | B2 | 5/2016 | Whitney et al. |
| 9,334,815 | B2 | 5/2016 | Cygan, Jr. et al. |
| 9,347,381 | B2 | 5/2016 | Long et al. |
| 9,376,965 | B2 | 6/2016 | Whitney et al. |
| 9,378,594 | B2 | 6/2016 | Wong et al. |
| 9,382,865 | B2 | 7/2016 | Genslak et al. |
| 9,388,754 | B2 | 7/2016 | Cygan, Jr. et al. |
| 9,388,758 | B2 | 7/2016 | Pochner et al. |
| 9,399,959 | B2 | 7/2016 | Whitney et al. |
| 9,429,085 | B2 | 8/2016 | Whitney et al. |
| 9,435,274 | B2 | 9/2016 | Wong et al. |
| 9,447,632 | B2 | 9/2016 | LeBlanc |
| 9,528,453 | B2 | 12/2016 | Whitney et al. |
| 9,534,547 | B2 | 1/2017 | Livshiz et al. |
| 9,541,019 | B2 | 1/2017 | Verdejo et al. |
| 9,587,573 | B2 | 3/2017 | Genslak et al. |
| 9,599,049 | B2 | 3/2017 | Zavala Jurado et al. |
| 9,599,053 | B2 | 3/2017 | Long et al. |
| 9,605,615 | B2 | 3/2017 | Long et al. |
| 9,669,822 | B2 | 6/2017 | Piper et al. |
| 9,714,616 | B2 | 7/2017 | Jin et al. |
| 9,732,499 | B2 | 8/2017 | Miyamoto et al. |
| 9,732,688 | B2 | 8/2017 | Cygan, Jr. et al. |
| 9,765,703 | B2 | 9/2017 | Whitney et al. |
| 9,784,198 | B2 | 10/2017 | Long et al. |
| 9,789,876 | B1 | 10/2017 | Livshiz et al. |
| 9,797,318 | B2 | 10/2017 | Storch et al. |
| 9,863,345 | B2 | 1/2018 | Wong et al. |
| 9,920,697 | B2 | 3/2018 | Pochner et al. |
| 9,927,780 | B2 | 3/2018 | Sun et al. |
| 9,963,150 | B2 | 5/2018 | Livshiz et al. |
| 9,989,150 | B2 | 6/2018 | Yamanaka et al. |
| 10,047,686 | B2 | 8/2018 | Jin |
| 10,093,147 | B2 * | 10/2018 | Bidner ............. B60H 1/00271 |
| 10,094,300 | B2 | 10/2018 | Cygan, Jr. et al. |
| 10,119,481 | B2 | 11/2018 | Livshiz et al. |
| 10,124,647 | B2 * | 11/2018 | Bidner ............. B60H 1/00271 |
| 10,125,712 | B2 | 11/2018 | Livshiz et al. |
| 10,156,197 | B1 | 12/2018 | Jin et al. |
| 10,167,746 | B2 | 1/2019 | Whitney et al. |
| 10,196,956 | B2 | 2/2019 | Alfieri et al. |
| 10,273,900 | B2 | 4/2019 | Whitney et al. |
| 10,358,140 | B2 | 7/2019 | Livshiz et al. |
| 10,399,574 | B2 | 9/2019 | Livshiz et al. |
| 10,450,972 | B2 | 10/2019 | Pochner et al. |
| 10,570,809 | B2 * | 2/2020 | Bidner ................ B60H 1/3208 |
| 10,690,042 | B2 * | 6/2020 | Karnik .................... B60H 1/3208 |
| 10,995,688 | B2 * | 5/2021 | Chen ...................... F01P 7/165 |
| 11,002,179 | B2 * | 5/2021 | Bidner ................ B60H 1/3208 |
| 2004/0116220 | A1 | 6/2004 | Yamamoto et al. |
| 2005/0065691 | A1 | 3/2005 | Cho |
| 2007/0191181 | A1 | 8/2007 | Burns |
| 2009/0288899 | A1 | 11/2009 | Belloso |
| 2010/0211294 | A1 | 8/2010 | Soejima |
| 2011/0053720 | A1 | 3/2011 | Kang et al. |
| 2012/0010860 | A1 | 1/2012 | Kirkling et al. |
| 2017/0016407 | A1 | 1/2017 | Whitney et al. |
| 2017/0082055 | A1 | 3/2017 | Cygan, Jr. et al. |
| 2018/0293814 | A1 | 10/2018 | Gilbert et al. |

(56) References Cited

U.S. PATENT DOCUMENTS

2019/0301387 A1 10/2019 Jin et al.
2019/0308626 A1 10/2019 Otanez et al.
2019/0353071 A1 11/2019 Camuglia et al.

FOREIGN PATENT DOCUMENTS

| | | |
|---|---|---|
| CN | 109519269 A | 3/2019 |
| WO | 2003065135 A1 | 8/2003 |

OTHER PUBLICATIONS

Esen, H. et al. (Jun. 16, 2014) Cabin heat thermal management in hybrid vehicles using model predictive control. 22nd Mediterranean Conference on Control and Automation.

Garcia, et al. (1989). Model predictive control theory and practice—a survey. Automatica. vol. 25, No. 3, pp. 335-348.

Chen, et al. (2003). Optimal control of nonlinear systems: a predictive control approach. Automatica vol. 39, No. 4, pp. 633-641.

Morel, et al. (1999). System model of engine thermal management. Presented at: VTMS, London, UK.

Chen, et al. (Jun. 4, 2019). Method and System for Determing Thermal State. U.S. Appl. No. 16/431,199.

John C.G. Boot, "Quadratic Programming: Algorithms, Anomalies, Applications, vol. 2 of Studies in Mathematical and Managerial Economics," North Holland Publ. Comp., 1964; 213 pages.

N. Lawrence Ricker, "Use of Quadratic Programming for Constrained Internal Model Control," Ind. Eng. Chem. Process Des. Dev., 1985, pp. 925-936.

C. E. Lemke, "A Method of Solution for Quadratic Programs," Rensselaer Polytechnic Institute, Troy, New York, Published Online: Jul. 1, 1962, pp. 442-453.

Kolmanovsky I., "Towards Engine and Powertrain Control Based on Model Predictive Control," Sep. 28, 2012, Powerpoint Presentation, 47 slides.

Gorinevsky, Lecture 14—Model Predictive Control Part 1: The Concept, Spring 2005, Powerpoint Presentation, 26 slides.

Bemporad, Alberto, "Model Predictive Control," Spring 2005, Powerpoint Presentation, 94 slides.

Boyd, S., "Model Predictive Control," Powerpoint Presentation, 25 slides.

U.S. Appl. No. 16/174,670, filed Oct. 30, 2018 by GM Global Technology Operations LLC, titled "Steady State Control of Model Predictive Control Based Powertrain With Continuously Variable Transmission".

U.S. Appl. No. 16/272,568, filed Feb. 11, 2019 by GM Global Technology Operations LLC, titled "Model Predictive Control of Torque Converter Clutch Slip".

U.S. Appl. No. 16/418,658, filed May 21, 2019 by GM Global Technology Operations LLC, titled "Method for Increasing Control Cost Functions".

* cited by examiner

ACTIVE THERMAL MANAGEMENT SYSTEM AND METHOD FOR FLOW CONTROL

TECHNICAL FIELD

The present disclosure generally relates to thermal management systems and more particularly relates to active thermal management of a cooling system using physics-based models and multivariable control for flow control.

BACKGROUND

In system control, the ability to make determinations is subject to limitations. In some cases, when individual components of a system are each controlled to a singular objective, cross-purpose outcomes result. In other cases, control decisions may exceed the physical system/component constraints. Both of these situations limit the effectiveness of control decisions. Accordingly, control determinations may result in control levels that are less than optimal from a system level perspective. For example, in a complex system with multiple, interrelated actuators, each actuator may be controlled by single input single output controllers that respond to a need to change one parameter, but repositioning one actuator may affect multiple parameters, including those controlled by other actuated devices. Also for example, when an actuator is positioned to a fully open or closed state, the effectiveness of achieving further requests for position changes is constrained.

In some applications such as those involving vehicle powertrains, coolant temperature sensors are typically available for providing inputs usable in making control determinations. However, multiple, continuously varying uses of the coolant may result is conflicts, limitations and unintended effects between those uses. For example, a common automotive coolant based fluid system may be used to conduct heat to or from various parts of the engine, the transmission, the heating, ventilation and air conditioning (HVAC) system, and other uses.

Accordingly, it is desirable to provide methods and systems to provide more flexibility and effectiveness in making control determinations. For example, improved flow control and improved balancing between uses is desirable. Furthermore, other desirable features and characteristics of the present invention will become apparent from the subsequent detailed description and the appended claims, taken in conjunction with the accompanying drawings and the foregoing technical field and background.

SUMMARY

A number of embodiments include systems and methods with active thermal management. A thermal management system includes a thermal system with fluid conduits. A sensor is disposed to monitor an input parameter state of the thermal system. An actuator is configured to vary a flow in the fluid conduits. A controller is configured to receive a signal representative of the input parameter state; process an actuator state through a flow model of the thermal system to obtain an existing flow in the fluid conduits; process the existing flow through a thermal model of the thermal system to determine an input that reduces an error between a desired parameter state and the input parameter state; process the input through an inverse flow model to convert the input to a desired actuator state; and position the actuator in the desired actuator state.

In additional embodiments, the controller is configured to calculate a cost function that includes a sum of the error between the desired parameter state and the input parameter state and an amount a position of the actuator is projected to change in a next control step.

In additional embodiments, the controller is configured to select a version of the input from a group of projected inputs, wherein the selected version has the cost function minimized.

In additional embodiments, the controller is configured to constrain the input to within a range.

In additional embodiments, the range is selected to consider physical limitations of the thermal management system and thermal management system performance factors.

In additional embodiments, the controller through a multivariable control module, is further configured to control operation of an internal combustion engine.

In additional embodiments, the sensor is configured to monitor a coolant temperature and to determine, using the coolant temperature, a wall temperature of the internal combustion engine.

In additional embodiments, at least one valve controls the flow through branches of the fluid conduits and the input parameter state comprises a position of the valve. The controller determines, based on the position of the valve, the flow in the branches.

In additional embodiments, the thermal system includes an internal combustion engine, a radiator, and a coolant system for distributing a coolant flow including through each of the engine, the radiator and the transmission oil heat exchanger. A valve controls coolant flow through the engine. Another valve controls coolant flow through the radiator. A pump circulates the coolant flow. A controller is configured to determine an effective flow area of each valve and a speed of the pump to deliver an amount of the coolant flow through each of the engine and the radiator that result in a desired wall temperature of the engine, and a desired temperature of the coolant leaving the radiator.

In additional embodiments, another valve controls coolant flow through a transmission oil heat exchanger. The controller is configured to determine an effective flow area setting of this valve that results in a desired temperature of the transmission.

In a number of additional embodiments, a method of controlling a thermal system includes a controller that receives a sensor signal representative of an initial state of at least one input parameter of the thermal system. A state of an actuator is processed through a flow model of the thermal system to determine at least one existing flow in thermal system. The existing flow is processed through a thermal model of the thermal system, to determine an input that reduces an error between a desired state of the at least one input parameter state and the initial state. The input is processed through an inverse flow model to convert the input to a desired state of the actuator. The actuator is operated into the desired actuator state.

In additional embodiments, a method includes a cost function calculation, which includes a sum of the error between the desired state and the initial state and an amount a position of the actuator is projected to change in a next control step.

In additional embodiments, a method includes selecting a version of the input from a group of projected inputs, wherein the version has the cost function minimized.

In additional embodiments, a method includes constraining the input to within a limited range.

In additional embodiments, a method include selecting the range to consider physical limitations of the thermal management system and of thermal management system performance factors.

In additional embodiments, e method includes operation of an internal combustion engine, which is controlled using the input parameters.

In additional embodiments, a method includes monitoring a coolant temperature of a coolant in the thermal system by a sensor. A wall temperature of the internal combustion engine is determined using the coolant temperature.

In additional embodiments, a method includes determining flow through a valve, based on the state of the actuator.

In additional embodiments, a method includes linearizing and discretizing the thermal model to obtain a discrete linear system form, prior to processing the thermal model.

In a number of additional embodiments, a vehicle includes a thermal system including an engine, a radiator, and a coolant system coupled with the engine and the radiator. An actuated valve modulates flow through the engine. Another actuated valve modulates flow through the radiator. An actuated pump circulates a main flow. Sensors generate signals representative of an initial state of a parameter of the thermal system. Initial actuator states are processed through a flow model of the thermal system to determine a rate of the flow through the engine and of the flow through the radiator, and to determine a speed of the pump. Effective flow area of each of the valves and speed of the pump are determined. The rates of flow through the engine and radiator and the speed of the pump are processed through a thermal model of the thermal system, to determine inputs. The inputs together, deliver an amount of flow through each of the engine and the radiator that result in a desired wall temperature of the engine, and a desired temperature of the coolant leaving the radiator. The inputs are processed through an inverse flow model to convert the inputs to desired states of the actuators. The actuators are positioned in the desired states.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit, an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of flow systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As described herein, disclosed thermal management systems and methods use a thermal model and flow model with multivariable control for thermal system control of various actuator to optimize powertrain thermal performance while meeting various system-level flow requests. In general, a coolant flow model is used to estimate coolant flows in each thermal system branch, and a multivariable controller uses a system thermal model to optimize branch flows and output target effective flow rates. An inverse of the coolant flow model is used to determine actuator positions from the effective flow rates. Actuators are used to position flow control devices for the desired effective flow rates and/or flow areas.

In a number of embodiments, the multivariable controller may employ a predictive controller with real time constraint optimization using a high-fidelity physics-based approach in which constraints of the flow control devices and system flow saturations are considered. Model-based virtual sensing may be used to estimate engine wall temperature ($T_{wall}$), which is difficult to measure directly and therefore there may be no sensor for measuring this parameter. The effective flow area of flow control devices is used as a control parameter to achieve desired temperatures with minimum pump flow for increased efficiency. Complete system level control overcomes individual component constraints and cross-purposes to satisfy all component level flow requests in a balanced approach. Optimization objectives may include determining flow rates and desired effective flow areas for a number of actuated devices.

Figure 1:
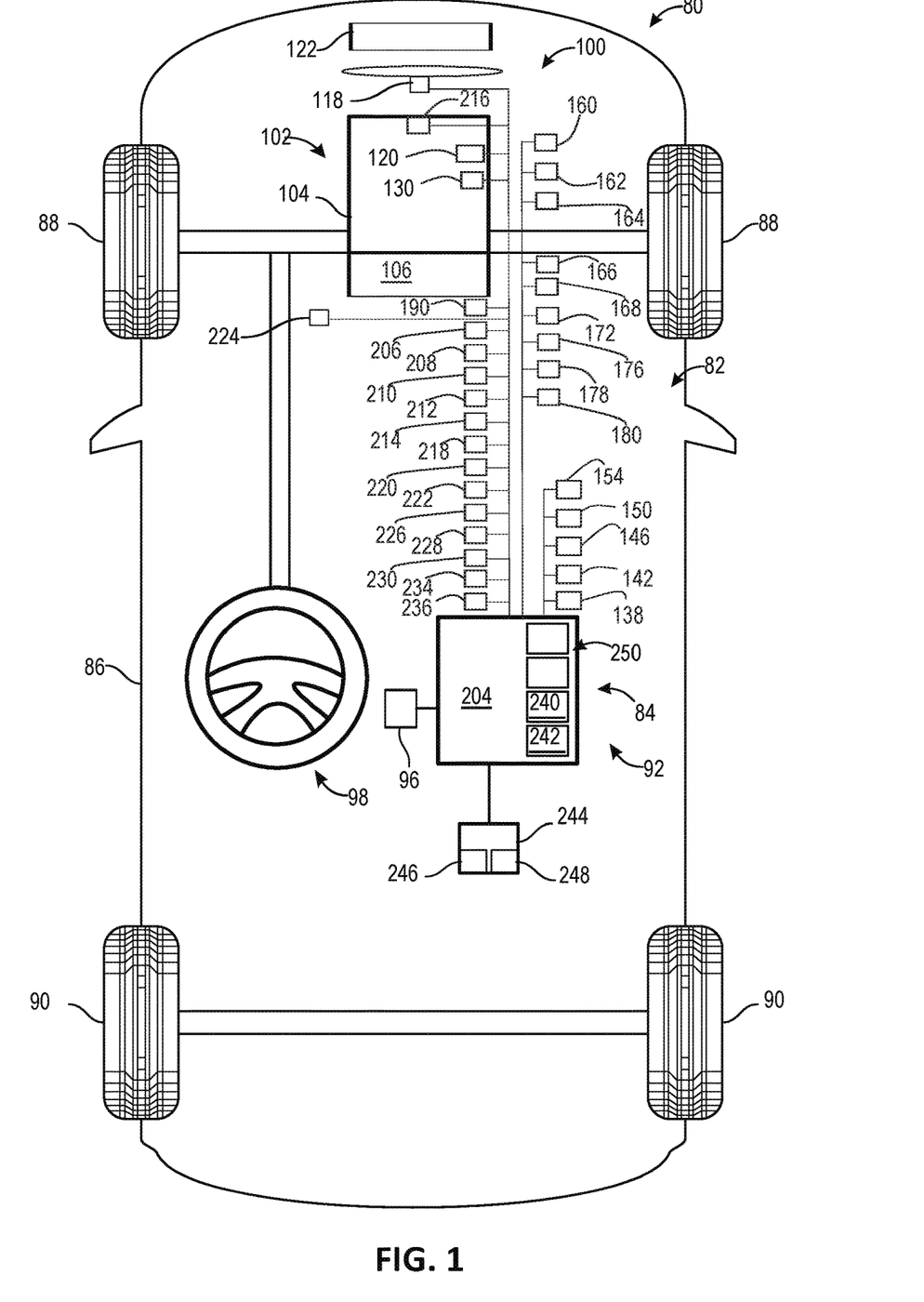
FIG. 1 is a schematic diagram of a vehicle with a thermal management system, in accordance with various embodiments.

With reference to FIG. 1, illustrated is a vehicle 80, with an engine management system 82 and one example of a thermal management system 84 for controlling the vehicle's thermal system 100. As will be discussed further herein, the thermal management system 84 controls coolant flow to manage temperatures for operational efficiency, passenger comfort, component protection and other objectives. The vehicle 80 is but one example of an application in which the thermal management system 84 may be employed and the disclosed thermal management system 84 is broadly useful in applications where coordinated system control, taking constraints into consideration, is desirable. The current disclosure is applicable to any such applications. So, although this disclosure may refer to the passenger vehicle context, various features and characteristics disclosed herein may be used in other contexts and applications. For example, various other types of vehicles and heated/cooled electro-mechanical system environments will benefit from the features described herein. Thus, no particular feature or characteristic is constrained to a passenger vehicle or to a propulsion system, and the principles are equally embodied in other vehicles, or in other machinery or equipment, and in other applications.

In some embodiments, the thermal management system 84 is associated with the vehicle 80. In various embodiments, the vehicle 80 may be an automobile, such as a car, a sport utility vehicle, a truck, or another ground vehicle. In other applications, the vehicle may be an aircraft, a spacecraft, a watercraft, or any other type of vehicle. For exemplary purposes the disclosure will be discussed in the context of the thermal management system 84 being used with an automobile as the vehicle 80. As depicted in FIG. 1, the vehicle 80 generally includes a body 86, front wheels 88, rear wheels 90, an electrical system 92 and a propulsion system 102. The body 86 may be arranged on, or integrated with, a chassis and substantially encloses the other components of the vehicle 80. In general, the electrical system 92 includes a controller 204 and a communication system 94. Additionally, one or more network communications protocols such as CAN or Flexray communication may be used by the communication system 94 to interface between the various control modules in the vehicle 80. In this embodiment, the propulsion system 102 includes an engine 104 and a transmission 106. In other embodiments the propulsion system 102 may be embodied as another type of powertrain, for example, a hybrid or electric system. The front and rear wheels 88, 90 are each rotationally coupled to the vehicle 80 near a respective corner of the body 86 and at least some of which are powered by the propulsion system 102. A HVAC system 96 is configured to condition the temperature of the vehicle's cabin and is connected in a common fluid circuit with the engine 104, the transmission 106, and the radiator 122 as is described in more detail below.

The steering system 98 of the vehicle 80 includes a steering column and a steering wheel. In various embodiments, the steering system 98 further includes various other features (not depicted in FIG. 1), such as a steering gear, intermediate connecting shafts between the column and the gear, connection joints, either flexible or rigid, allowing desired articulation angles between the intermediate connecting shafts, and tie-rods. The steering gear in turn, may comprise a rack, input shaft, and internal gearing. In various embodiments, the above described methods and systems can also be implemented for steer-by-wire systems. Steer-by-wire systems use electrical and/or electro-mechanical systems to control the vehicle (e.g., steering) instead of traditional mechanical linkages. For example, a steer-by-wire system can use electromechanical actuators and human-machine interfaces (e.g., a steering feel emulator, etc.) to control the vehicle. Accordingly, mechanical components such as the steering intermediate shaft and other associated components are not needed to control the vehicle.

In some examples, the components of the thermal management system 84 may be depicted as being part of the same system. It will be appreciated that in certain embodiments these features may comprise multiple systems. In addition, in various embodiments, the thermal management system 84 may comprise all or part of, and/or may be coupled to, various other vehicle devices and systems, such as, among others, the propulsion system 102, the HVAC system 96, or one or more other systems of the vehicle 80.

As will be discussed further herein, the propulsion system 102 is controlled with improved performance and efficiency. The thermal system 100 is but one example of the systems for which the improved flow control provided hereby is useful. The disclosed methods are useful in the exemplary applications described herein, because they provide optimized vehicle thermal performance with enhanced control to meet a broader range of system level flow requests than otherwise achieved. The current disclosure is applicable to other applications where improved performance and more effective control are desirable.

As can be appreciated, the vehicle 80 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 80 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

Figure 2:
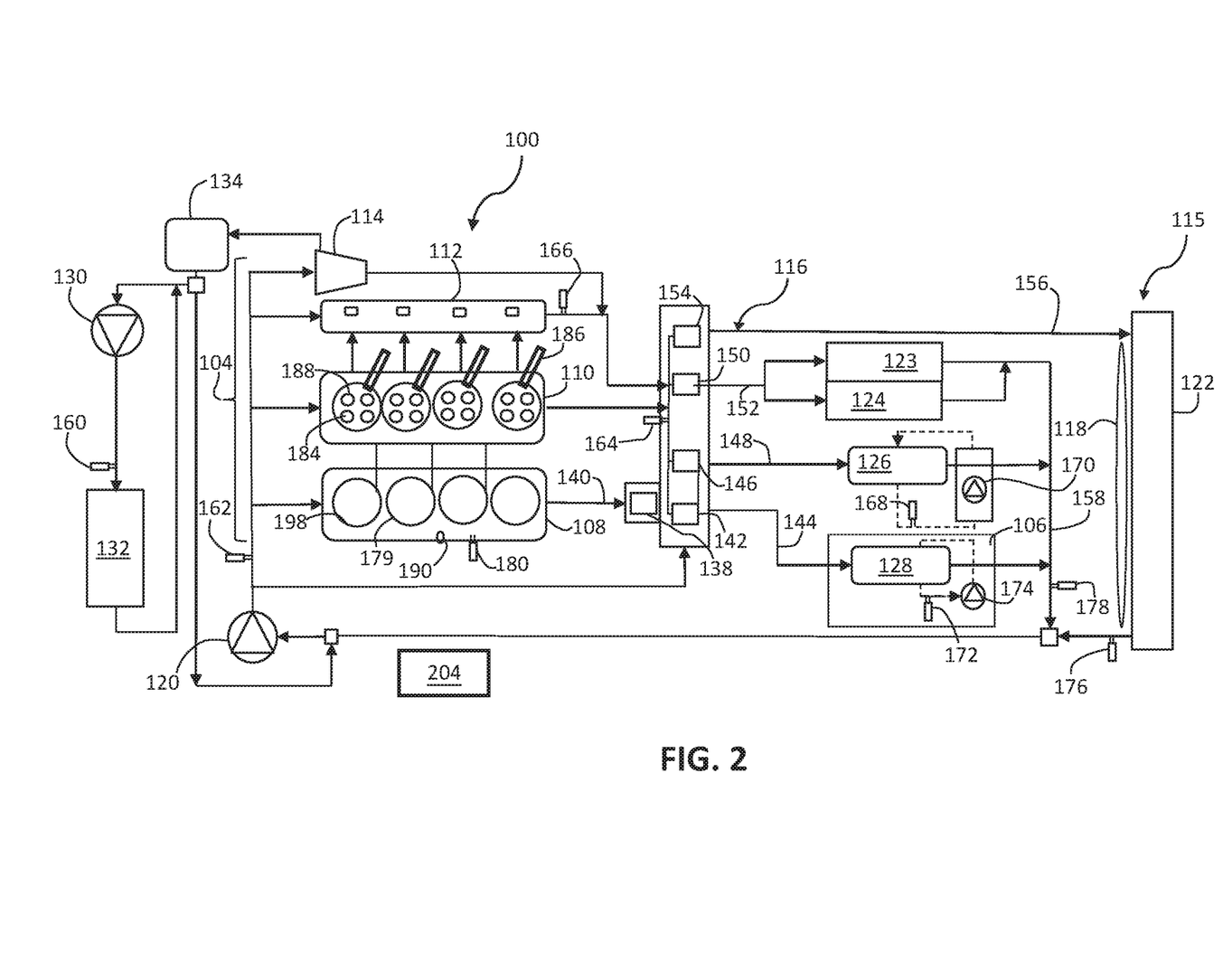
FIG. 2 is a schematic diagram of a thermal system of the vehicle of FIG. 1, in accordance with various embodiments.

Referring additionally to FIG. 2, the propulsion system 102 generally includes the engine 104 and the transmission 106. In general, the engine 104 includes a block 108, a head 110, manifolds of which exhaust manifold 112 is an example, and a turbocharger 114. These components comprise a considerable mass and house the combustion process, resulting in substantial disturbances in the thermal system. It will be understood that in application, the block 108, the head 110, the exhaust manifold 112 and the turbocharger 114 will be assembled into an operational engine 104. In addition, the exhaust manifold 112 may be an integrated exhaust manifold formed as one piece with the head 110. Each of the block 108, the head 110, the exhaust manifold 112 and the turbocharger 114 are cooled components and therefore provide inputs that disturb the thermal system 100. In addition, the temperature of each may be a controlled to obtain desirable operational characteristics, particularly to control combustion efficiently.

The thermal system 100 includes a number of fluid conduits 116 indicated as a group, and configured to provide interconnections and to direct and channel fluid flow. The conduits 116 may comprise ducts, tubes, hoses, passageways and other defined channels of various sizes. Flow in any given branch is generally a function of pump operation, valve position and conduit configuration, with the valves modulating flow through branches and the pump determining the overall system flow rate. Branch flows are also interdependent, with changes in one branch having an effect on other branches.

The thermal system 100 includes a main coolant pump 120, which in the current embodiment is an electrically driven pump that generates the flows through the branches.

In other embodiments, the pump 120 may be driven by other mechanisms, such as mechanically by the engine 104. In general, the pump 120 circulates coolant fluid through the engine 104, the radiator 122, a pair of heater cores 123, 124 of the HVAC system 96, an engine oil heat exchanger 126 and a transmission oil heat exchanger 128. The fan 118 is disposed adjacent the radiator to assist in air flow for heat exchange to the ambient air. The thermal system 100 also includes a charge air cooling pump 130, which circulates fluid through a heat exchanger in the form of a charge air cooler 132. A surge tank 134 may be included to accommodate thermal expansion and contraction of the fluid in the thermal system 100.

In the current embodiment, a number of valves control the flow of fluid through different branches of the thermal system 100, which in this example is embodied as a coolant system 115 as defined in-part by the conduits 116. A block valve 138 is disposed in the conduit between the engine block 108 and the radiator 122. The block valve 138 controls the amount of coolant delivered by the pump 120 that circulates through the branch 140 and the engine block 108. The position of the block valve 138 also influences the split of flow through the block 108 versus the other parts of the engine 104. For example, as the block valve 138 is moved in a closing direction, more coolant is directed to the head 110, exhaust manifold 112 and turbocharger 114 and less through the block 108. In some embodiments, valves may be included to individually control flow through the head 110 and the exhaust system components 112, 114. A transmission valve 142 is disposed in a branch 144 that contains the transmission oil heat exchanger 128, An additional valve 146 is disposed in a branch 148 that contains the engine oil heat exchanger 126, and a heater valve 150 is disposed in a branch 152 that contains the heater cores 123, 124. A radiator valve 154 controls flow through a branch 156 that includes the radiator 122, and as a result determines how much radiator cooled flow is provided as opposed to return flow for recirculation through the branch 158. The valves may be rotary valves or another type of fluid flow control valve and each is operated through an actuator as identified below.

Each of the charge air cooler 132, the engine 104, the heater cores 123, 124, the oil heat exchangers 126, 128 and the radiator 122 create disturbances in the thermal system 100, acting as sources of significant temperature changes to the coolant. A charge air inlet sensor 160 is disposed in the conduit near the inlet to the charge air cooler 132. Readings from the sensor 160 may be used to determine the amount of flow delivered through the charge air cooler 132 by the pump 130, to supply the amount of cooling that is needed to cool engine intake air after it passes through the turbocharger 114 and before it enters the engine 104. Incoming air temperature has an effect on engine power and fuel economy and so the temperature may be modulated using the charge air cooler 132 for preferred operating results.

A number of temperature sensors are included to monitor the coolant temperature at various locations to provide useful information in controlling the propulsion system 102. The temperature sensors are generally shown both in FIG. 2 and in FIG. 1. In FIG. 1 the location of the various sensors is generally onboard the vehicle 80, but not necessary in their specific location of use, which is schematically specified in relation to FIG. 2. An engine-in sensor 162 is disposed to monitor coolant temperature prior to entering the engine 104, and an engine-out sensor 164 is disposed to monitor coolant temperature after exiting the engine 104. A head sensor 166 is disposed to monitor coolant temperature after exiting the head 110 and exhaust manifold 112, which in the current embodiment is combined in an integrated casting. An engine oil temperature sensor 168 monitors temperature of the engine oil as circulated by an engine oil pump 170 and a transmission oil sensor 172 monitors temperature of the transmission oil as circulated by a transmission oil pump 174. A radiator sensor 176 monitors the temperature of coolant leaving the radiator 122, a return sensor 178 monitors the temperature of the coolant recirculated through the branch 158, a block coolant sensor 180 monitors temperature of the coolant in the engine block 108, a transmission temperature sensor 181 monitors transmission temperature, and an ambient temperature sensor 182 monitors ambient air temperature.

The engine 104 includes a number of cylinders 179, each of which is associated with intake valves 184 for supplying air, an injector 186 for supplying fuel and exhaust valves 188 for evacuation of the cylinder 179 following combustion. The combustion air supplied through the intake valves 184 is compressed by the turbocharger 114. Compression causes the combustion air to become heated. Accordingly, the compressed, heated combustion air may be cooled in the charge air cooler 132 before passing to the cylinder 179. Components typically included but not shown, include an exhaust system and various other valves, sensors, and the like that may be provided for operating the exhaust system including for exhaust gas recirculation. The valves 184, 188 may be actuated by cam shafts (not shown) rotating in time with a crankshaft (also not shown). In some examples, a cam phaser (not shown) may selectively vary the timing between the camshaft and the crankshaft.

The propulsion system 102 may further include the engine management system 82 (FIG. 1), including the controller 204 in communication with the various sensors and other devices associated with various automotive system components. Generally, the controller 204 is configured to receive inputs from various sensors which are configured to generate signals in proportion to various physical input parameters associated with the engine 104, its subsystems and other interrelated systems. The current disclosure provides systems and methods to accurately determine coolant flow requirements and control the various valves to set effective flow areas for use in accurately controlling the thermal system 100.

As depicted in FIG. 1, in the current embodiment the various sensors include, but are not limited to, a mass airflow and temperature sensor 206, a manifold pressure and temperature sensor 208, a combustion pressure sensor 210, a fuel rail pressure sensor 212, a cam position sensor 214, a crank position/rotational speed sensor 216, exhaust pressure sensors 218, an exhaust temperature sensor 220, NOx sensors 222, and an accelerator pedal position sensor 224. The controller 204 generates output signals delivered to various controlled devices/actuators that are arranged to control the operation of the propulsion system 102, including, but not limited to, fuel injectors 226, a throttle valve 228, an EGR valve 230, an VGT actuator 234, and cam phasers 236. Additional output signals may be generated by the controller 204, for example, additional output signals may be associated with the thermal system 100. In some embodiments, a thermal system control module or modules 250 may be implemented by, or in coordination with, the controller 204 to control operation of the thermal system 100 and to provide inputs for use in other operations of the engine 104, such as in controlling fuel and air supplied to the cylinders, ignition timing and other functions. In this context, the controller 204, and/or more specifically the thermal system control module(s) 250, may receive inputs from the temperature sensors, the actuators and other sources. The engine management system 82 also includes the actuators comprising those of the main coolant pump 120 (motor 121), the charge air cooling pump 130 (motor 131), the fan 118 (motor 119), and the valves 138 (actuator 139), 142 (actuator 143), 146 (actuator 147), 150 (actuator 151) and 154 (actuator 155). The actuators 121, 131, 118, 139, 143, 147, 151 and 155 may be electric motors or any other actuator type. Also included as part of the engine management system 82 are the block heater 190 and the temperature sensors 160, 162, 164, 166, 168, 172, 176, 178 and 180. It will be understood that FIG. 1 illustrates system schematics for purposes of the present disclosure and doesn't necessarily depict all typical components of a propulsion system or its control system.

The controller 204 may comprise any number of electronic control modules and is configured to receive information from various sources, process that information, and provide control signals/commands based thereon to effect outcomes such as operation of the propulsion system 102 and related systems, including the thermal system 100. It will be appreciated that operation of the propulsion system 102 and the thermal system 100 is closely related and overlapping.

In the depicted embodiment, the controller 204 includes a processor 240 and a memory device 242, and is coupled with a storage device 244. The processor 240 performs the computation and control functions of the controller 204, and may comprise any type of processor or multiple processors, single integrated circuits such as a microprocessor, or any suitable number of integrated circuit devices and/or circuit boards working in cooperation to accomplish the functions of a processing unit. During operation, the processor 240 executes one or more programs 246 and may use data 248, each of which may be contained within the storage device 244 and as such, the processor 240 controls the general operation of the controller 204 in executing the processes described herein, such as the processes described further below in connection with FIGS. 3-5.

The memory device 242 may be any type of suitable memory. For example, the memory device 242 may include volatile and nonvolatile storage in read-only memory (ROM), random-access memory (RAM), and keep-alive memory (KAM), for example. KAM may comprise a persistent or non-volatile memory that may be used to store various operating variables while the processor 240 is powered down. The memory device 242 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 204. In certain embodiments, the memory device 242 may be located on and/or co-located on the same computer chip as the processor 240. In the depicted embodiment, the memory device 242 may store the above-referenced programs 246 along with one or more stored values of the data 248 such as for short-term data access.

The storage device 244 stores data, such as for long-term data access for use in automatically controlling the propulsion system 102 and its related systems. The storage device 244 may be any suitable type of storage apparatus, including direct access storage devices such as hard disk drives, flash systems, floppy disk drives and optical disk drives. In one exemplary embodiment, the storage device 244 comprises a source from which the memory device 242 receives the programs that execute one or more embodiments of one or more processes of the present disclosure, such as the steps of the process (and any sub-processes thereof) described further below in connection with FIG. 4. In another exemplary embodiment, the programs 246 may be directly stored in and/or otherwise accessed by the memory device 242. The programs 246 represent executable instructions, used by the electronic controller 204 in processing information and in controlling the propulsion system 102 and its systems, including the engine management system 82. The instructions may include one or more separate programs, each of which comprises an ordered listing of executable instructions for implementing logical functions. The instructions, when executed by the processor 240 support the receipt and processing of signals such as from the various sensors, and the performance of logic, calculations, methods and/or algorithms for automatically controlling the components and systems of the propulsion system 102. The processor 240 may generate control signals for the engine management system 82, and to automatically control various components and systems of the propulsion system 102 and the thermal system 100 and propulsion system 102, based on the logic, calculations, methods, and/or algorithms. As will be appreciated, the data storage device 244 may be part of the controller 204, separate from the controller 204, part of one or more of the controllers, or part of multiple systems. The memory device 242 and the data storage device 244 work together with the processor 240 to access and use the programs 246 and the data 248. While the components of the engine management system 82 and thermal management system 84 are depicted as being part of the same system, it will be appreciated that in certain embodiments, these features may comprise multiple systems. In addition, in various embodiments the engine management system 82 and the thermal management system, 84 may comprise all or part of, and/or may be coupled to, various other vehicle devices and systems.

The engine management system 82 and thermal management system 84 control operation of the propulsion system 102 and the thermal system 100 to deliver the desired operational performance including emission management. In general, the controller 204 uses the available inputs, including those from the various sensors and actuators identified above, to provide the engine management system 82 with parameter data to effectively govern various functions of the engine 104. For example, based on the data input, the controller 204 precisely calculates and controls delivery of the appropriate air-fuel mixture and exhaust gas recirculation through operation of the fuel injectors 226, throttle valve 228, EGR valve 230, cam phaser 236 and VGT actuator 234, and may control other parameters such as spark timing. The engine management system 82 and/or the thermal management system 84 also control the pumps 120, 130 to deliver the appropriate amount of fluid flow through the various branches of the thermal system 100. To schedule control of combustion within the individual cylinders 179, the conditions, including temperature, where the combustion will occur are pertinent. In-cylinder combustion creates significant disturbances in the thermal system 100, and the combustion process is impacted by temperatures.

Thermal disturbances of the propulsion system 102 and the thermal system 100 are extremely dynamic. Heat transfer to/from the coolant is sensed by the various coolant temperature sensors in the system, which provide indicators of engine 104 and transmission temperatures and are included in the information provided to the controller 204. A temperature that has a significant influence over the combustion in the individual cylinders 179 is the wall temperature $T_{wall}$ at the block wall 198 of each respective cylinder within which combustion occurs. Using $T_{wall}$ to make control decision provides improved information because it avoids delays while combustion and other disturbance heat transfers to the coolant at locations where measurements occur. However, measuring $T_{wall}$ directly is generally not be practical and therefore no sensor delivers parameter data. Accordingly, to carry out control determinations, as disclosed herein, a form of virtual temperature sensing is effected by the engine management system 82 using a thermal model as described below.

Figure 3:
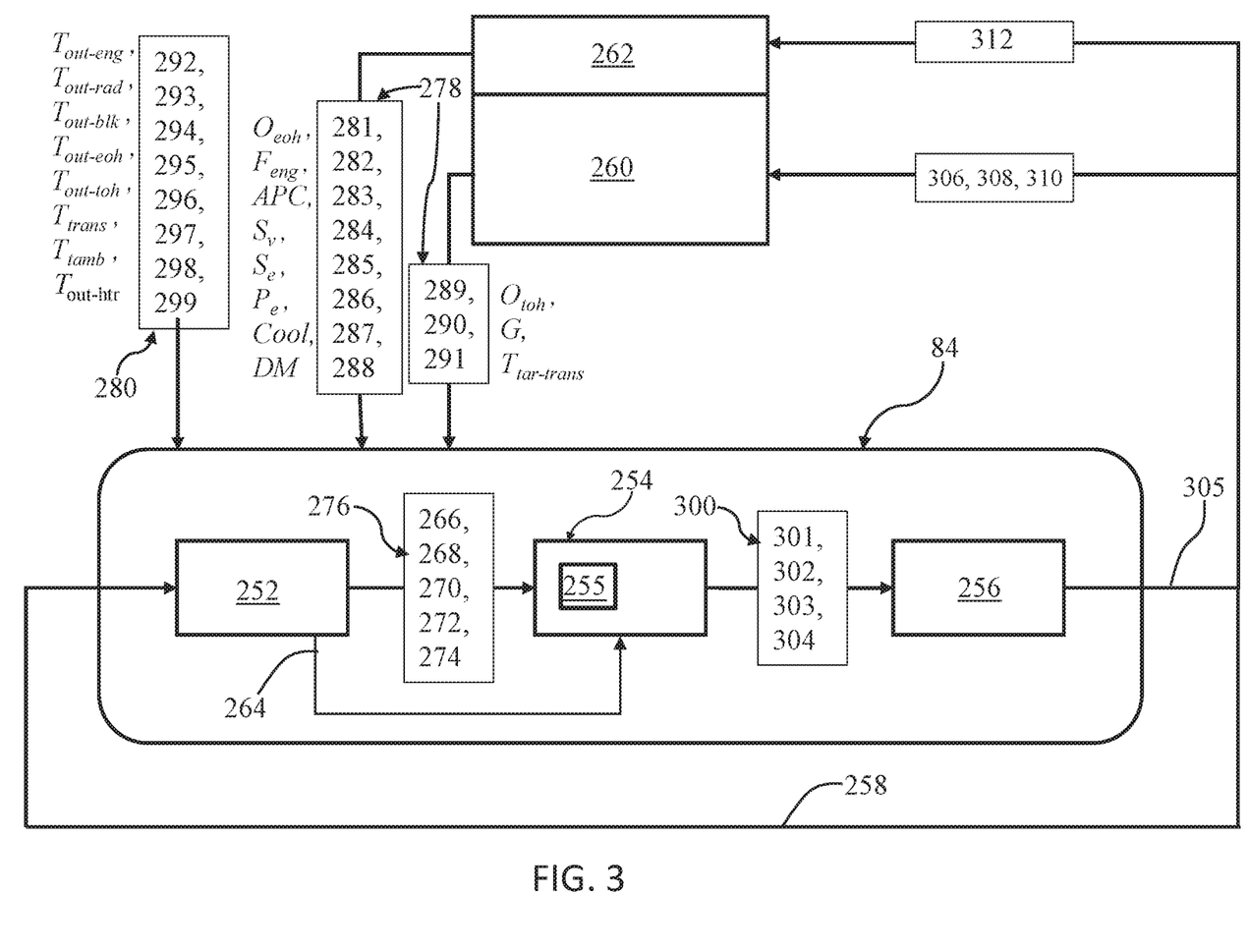
FIG. 3 is a functional block diagram of the thermal management system, in accordance with various embodiments.

Referring to FIG. 3, in general the thermal management system 84 controls operation of the various pumps and valves and other actuators in the thermal system 100. The current description concentrates on control of the main coolant pump 120, the radiator valve 154, the block valve 138, and the transmission valve 142 and is directed to the control approach for these aspects. It will be appreciated that control of the thermal system 100 is not limited to control of these actuators but instead will control other devices and will include other control approaches to coordinate with the control described herein. The thermal management system 84 may comprise any number of controllers and may coordinate with other discrete controllers such as of the engine 104, the transmission 106, and the HVAC system 96.

In general, a flow model 252 of the thermal management system 84 uses a flow model that may be constructed using a physics-based approach, an experiment-based approach, or other means. For example, the flow model of the flow model 252 may be created using commercially available computational fluid dynamics software for high-fidelity simulations. The system's valves are modelled using effective flow area and its relation to actuator position. To obtain the effective flow areas that result during each valve's opening and closing, the values may be determined by calculation or from experiment and computed real-time or stored as data 248. Using the flow model, branch flows may be determined based on actuator state and any relevant sensor inputs that may be available. Accordingly, the flow model is used to determine flow through the various actuators based on feedback 258 of their states 305, which include position of the radiator valve 154, the block valve 138, and the transmission valve 142 and speed of the main coolant pump 120.

In general, a multivariable controller 254 includes a multivariable control approach such as predictive control and uses a thermal model 255 of the propulsion system 102 such as a high-resolution complete powertrain thermal model, capable of simultaneously reporting the local temperature of components, and the global engine heat balance at any engine load. Heat sources and heat sinks are detailed and implemented together, enabling simulation of their mutual thermal interactions. Boundary-conditions describing heat sources and sinks may be obtained from measurements as well as models. The thermal model 255 may be constructed using commercially available software for constructing physics-based models of thermal systems. The CAD math model of the engine 104 and other components may be used in constructing the model. The thermal model 255 uses available input parameters and may consider a multiple of factors such as ambient temperature, engine on time, the effects of combustion, friction, and others. In other embodiments, the thermal model 255 may be constructed using characteristic testing, determining trends and recording results such as in lookup tables and stored as data 248. In these embodiments, the thermal model 255 may use inputs including the flow rates 276 and the input parameters 278 to determine the corresponding values in the lookup tables. In other embodiments, the thermal model 255 may be constructed using calculations to determine the results from the flow rates 276 and the input parameters 278. The thermal model 255 may be constructed from a combination of approaches and may consider both steady state and transient operation. The multivariable controller 254 may be an integral part of the controls for the engine 104 and/or the thermal management system 84, and may be in communication with the engine controller 260 and the transmission controller 262.

In general, an inverse flow model 256 uses an inverse of the flow model 252 described above to process inputs received from the multivariable controller 254 and determine actuator states 305. The actuator states 305 are delivered to the controlled devices and also provided through a feedback loop to the flow model 252. The thermal management system 84 uses the flow and thermal models 252, 255 to compute control decisions. For example, commands to increase the flow through the transmission valve 142 changes the branch flows through various parts of the system and has thermal effects on other components served by the cooling system. Accordingly, both changes in flows and changes in temperatures are considered in optimizing new positions for the various actuators together in a rebalanced approach, rather than just repositioning the transmission valve 142.

The thermal management system 84 receives the inputs through the feedback loop 258 for processing along with input parameters 278 and measured temperatures 280. The input parameters received from the engine controller 260 include: engine oil flow through the engine oil heat exchanger ($O_{eoh}$) 281; fuel flow to the engine ($F_{eng}$) 282; engine fresh air per cylinder (APC) 283; vehicle speed ($S_v$) 284; engine speed ($S_e$) 285; engine power ($P_e$) 286; coolant switch state (Cool) 287; and coolant distribution mode (DM) 288. Cool and DM provide information of the coolant system's current configuration. For example, preset configurations may be programmed such as to provide coolant overtemperature conditions by diverting flow away from noncritical heat sources or scaling back engine output. The input parameters received from the transmission controller 262 include: transmission oil flow through the trans oil heat exchanger ($O_{toh}$) 289; gear selection (G) 290 and target transmission temperature ($T_{tar-trans}$) 291. The measured temperatures 280 include coolant temperature leaving the engine ($T_{out-eng}$) 292; coolant temperature leaving the radiator ($T_{out-rad}$) 293, coolant temperature leaving the engine block ($T_{out-blk}$) 294; engine oil temperature leaving the engine oil heat exchanger ($T_{out-eoh}$) 295; transmission oil temperature leaving the transmission ($T_{out-toh}$) 296; transmission temperature ($T_{trans}$) 297; ambient temperature ($T_{amb}$) 298; and coolant temperature leaving the heater cores ($T_{out-htr}$) 299.

Returning again to the flow model 252, it receive inputs through the feedback loop 258 which define the speed of the main coolant pump 120 and positions of the actuators for the radiator valve 154, the block valve 138, and the transmission valve 142. The flow model 252 maps valve (actuator) positions and pump speed to branch flow rates in the coolant system 115 for use by the multivariable controller 254. Using relevant input parameters 278, the flow model 252 runs simulations of the thermal system 100 and delivers inputs 264, 276 to the multivariable controller 254 at time t=k−1. The inputs in the form of flow rates 276 may include derived coolant flow 266 through the engine block 108, coolant flow 268 through the engine oil heat exchanger 126, coolant flow 270 through the radiator, coolant flow 272 through the transmission oil heat exchanger 128 and coolant flow 274 through the HVAC system's heater cores 123, 124. The flow model 252 may also deliver additional calculated branch flow rates and states as inputs 264 for use by the multivariable controller 254, including for determining $T_{wall}$.

The multivariable controller 254 receives and processes the inputs 264, the flow rates 276, the input parameters 278, and temperatures 280 and delivers inputs 300 at time t=k. The inputs 300 comprise flow rate 301 of the main coolant pump 120 and effective flow areas 302, 303, 304 of the block valve 138 the radiator valve 154 and the transmission valve 142, respectively. The multivariable controller 254 may determine desired temperatures based of the inputs and thermal system modelling, and operate to reduce an error between the resulting desired temperatures and the measured temperatures 280. In some embodiments, the multivariable controller 254 may comprise a predictive control approach and may include real time constraint optimization using feedback control. An example implementation is model predictive control (MPC) and may include linear time varying (LTV) prediction models. The thermal model 255 is linearized from the nonlinear system and at each time step (k−1, k, k+1, . . . ), the system is discretized to convert the continuously varying system into a discrete system equivalent. At each time step an optimization is run over the horizon to address changing system dynamics and to reach the optimal solution. Constraints such as the physical limitations of the actuators/actuated devices and flow saturation rates of various branches are factored. A set of outcomes is determined by running the thermal model 255 using different control strategies and the optimal trajectory is selected and the immediate next control step is selected from the optimal option for the inputs 300 at t=k.

The inputs 300 are processed through the inverse flow model 256. The multivariable controller 254 produces the inputs 300 in the form of pump flow rate and effective valve areas. In order to actuate the pump 120 which operates in the domain of RPM, and the valves which operate in the domain of valve (actuator) position, the inverse flow model 256 maps from pump flow rate back into pump RPM, so that the pump can be actuated, and from effective flow areas of the valves back to valve (actuator) positions to position the valves. Using the inverse flow model the flow rate 301 and the effective flow areas 302, 303, 304 are transformed to actuator states 305 including speed 306 of the main coolant pump 120, actuator position 308 of the block valve 138, actuator position 310 of the radiator valve 154, and actuator position 312 of the transmission valve 142. The actuator states 305 may be delivered through the engine controller 260 and the transmission controller 262 or may be delivered directly to the actuators. The actuator states 305 are also fed back 258 to the flow model 252.

Figure 4:
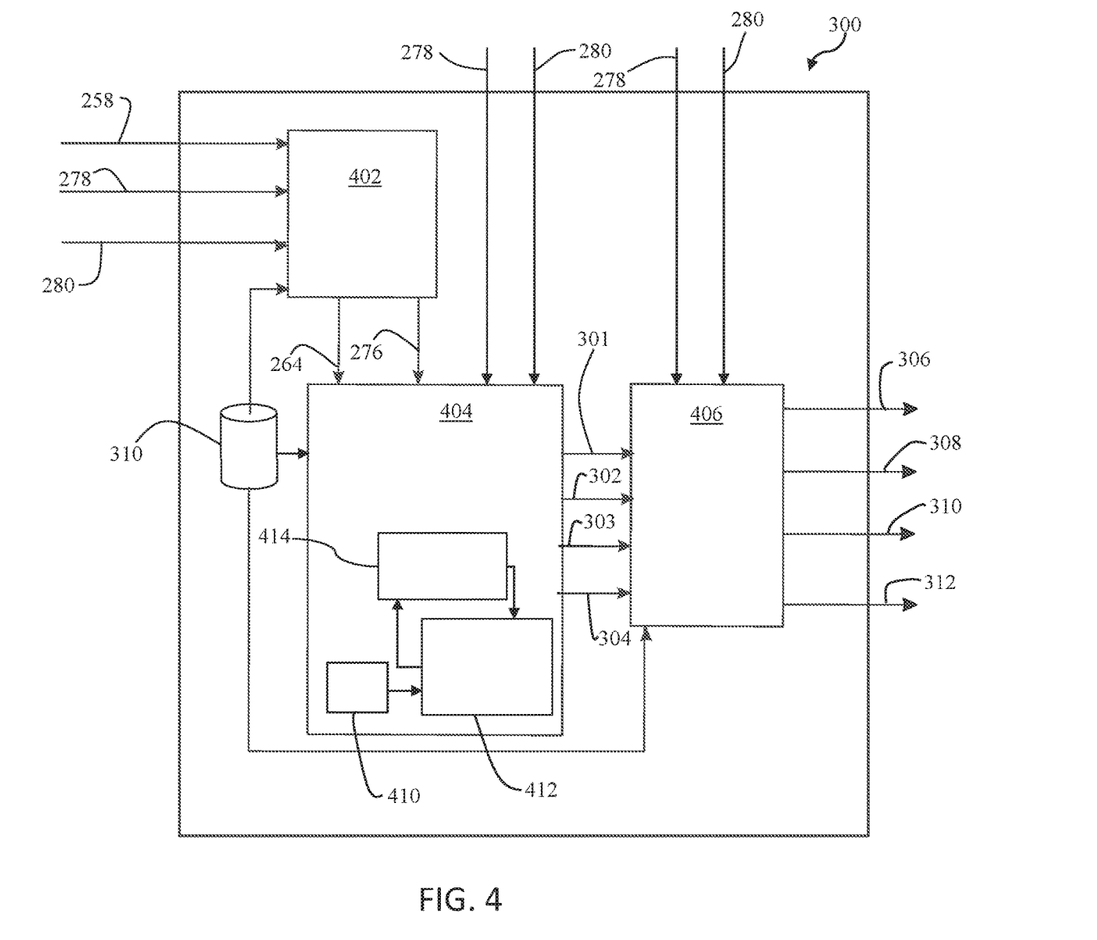
FIG. 4 is a data flow diagram of the thermal management system, in accordance with various embodiments.
Figure 5:
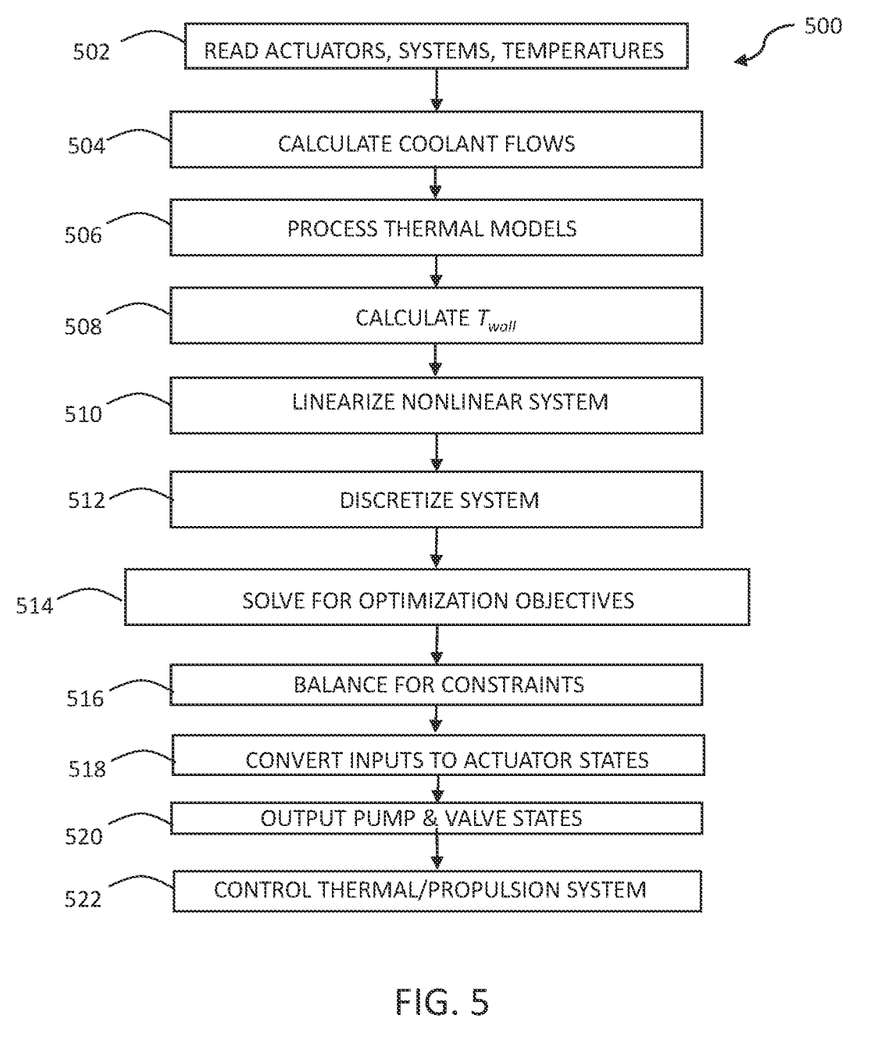
FIG. 5 is a flowchart illustrating a process for determining thermal states that may be performed using the system of FIGS. 1 and 2, in accordance with various embodiments.

Referring to FIG. 4 concurrently with FIG. 5, the thermal management system 84 and its operation, or a part thereof, may be embodied in a control structure 400 and a process 500. The structure 400 may include a number of modules for carrying out the process 500 to provide the controller 204 with useful information to control the propulsion system 102 and the thermal system 100, which may be done as part of the control of the propulsion system 102. In various embodiments, the control structure 400 generally includes a flow model calculation module 402, a multivariable control module 404, an inverse flow model calculation module 406, and a datastore 408. The control structure 400 may include any number of additional modules to control aspects of the engine 104, the transmission 106, the HVAC system 96, and the thermal system 100 independent of, or in coordination with the modules of the control structure 400. For example, the modules (not shown) that schedule the position of the throttle valve 228 may use the calculations and outputs of the control structure 400 in determining the appropriate throttle position at any given time.

The flow model calculation module 402 samples/obtains 502 the inputs. This includes receiving the state 305 information through the feedback loop 258 along with obtaining any needed actuator, system and temperature information 278, 280. The inputs through the feedback loop 258 of the states 305 of the actuators include initial speed 306 of the motor for the main coolant pump 120 and initial positions 308, 310, 312 of the actuators 139, 155, 143 for the block valve 138, the radiator valve 154, and the transmission valve 142, respectively. The relevant input parameters 278 for example, may include Cool 287 and DM 288. In some embodiments, the flow model calculation module 402 obtains inputs from other available sensors, such as flow sensors (not shown) that may be included to monitor flow conditions. To understand changes in the thermal system 100 for its respective topology, flow conditions in the various branches are determined. Based on the layout, features and dimensions of the fluid conduits 116, speed of the main coolant pump 120 and positions of all the valves 138, 142, 146, 150 and 154, the flow in each branch is calculated 504. In various embodiments, the branch flows may be calculated 504 using computational fluid dynamics. In other embodiments, the branch flows may be predetermined by characteristic testing and stored in the storage device 244 as data 248, such as in lookup tables where flows are correlated to pump speed and valve positions. In additional embodiments, data for defining the branch flows may be determined by modelling of the thermal system 100 using commercially available computational fluid dynamics software. The data and/or algorithms used to carry out the calculations/determinations may be retrieved from the datastore 408 and specifically from the storage device 244. In sum, the branch flows are determined based on actuator state and any relevant sensor inputs that may be available using the flow model of the thermal system 100. The calculated 504 branch flows are used in the flow model by the flow model calculation module 402 to determine the inputs 264, 276 for the multivariable controller 254.

The multivariable control module 404 receives the inputs including the flow rates 276, which include the coolant flow 268 through the engine oil heat exchanger 126, the coolant flow 270 through the radiator, the coolant flow 272 through the transmission oil heat exchanger 128, and the coolant flow 274 through the HVAC system's heater cores 123, 124. The inputs 264 may include additional computed flow rates of the thermal system 100, the states 305, and other desired results of the flow modelling. The multivariable control module 404 also receives the input parameters 278 including $O_{eoh}$ 281, $F_{eng}$ 282, APC 283, $S_v$ 284, $S_e$ 285, $P_e$ 286, Cool 287, DM 288, $O_{toh}$ 289, G 290 and $T_{tar\text{-}trans}$ 291. The multivariable control module 404 also receives the measured temperatures 280 including $T_{out\text{-}eng}$ 292, $T_{out\text{-}rad}$ 293, $T_{out\text{-}blk}$ 294, $T_{out\text{-}eoh}$ 295, $T_{out\text{-}toh}$ 296, $T_{trans}$ 297, $T_{amb}$ 298; and $T_{out\text{-}htr}$ 299. The multivariable control module 404 may receive inputs from other modules of the engine management system 82. For example, the multivariable control module 404 may receive propulsion system inputs such as position of the accelerator pedal 224, position of the EGR valve 230, and other parameters that create disturbances/have an effect on, the thermal system 100. The multivariable control module 404 uses broad base of data including the input parameters 278, the measured temperatures 280, the inputs 264 resulting from the flow calculations as communicated from the flow model calculation module 402, the flow rates 276, and the thermal model of the thermal system 100.

The thermal model is processed 506 in the multivariable control module 404 including for linearization 510, discretization 512 and for calculating 508 $T_{wall}$. The thermal model results, the measured temperatures 280, and the inputs 264 of the flow calculation results may be used to calculate 508 selected parameters such as $T_{wall}$ in the calculate submodule 410. The multivariable control module 404 determines desired temperatures based of the input parameters 278 and operates to reduce an error between the desired temperatures and the measured temperatures 280. Expected thermal state values based on various processing of the thermal model in the thermal model submodule 412 are projected into the future based on the current system inputs 278, 280 and calculated flows inputs 264, and other branch flow determinations such as those needed to calculate 508 $T_{wall}$.

The states are calculated based on the current sensed temperatures 280 and the current input parameters 278. The input parameters 278 may entered into linear system matrices for analysis. The thermal system 100 may be represented, at least in-part, using an extended Kalman filter approach. The functions may be created using the nonlinear model: $\dot{x}=f(x, p, u)$, where x are states representing the various temperatures 280 inside thermal system 100 that are used for controlling the propulsion system 102, p are the system parameters 278, and u are the current system states including the actuator states 305 at t=k.

Given the current estimate $\hat{x}[k-1|k-1]$ and the current system inputs (u[k−1]), and system parameters p[k−1], the nonlinear model is used to solve for the projected state at $\hat{x}[k|k-1]$. Integration methods may be used to perform a solving step. An example method is the simple Euler's method where: $\hat{x}[k|k-1]=\hat{x}[k-1|k-1]+f(\hat{x}[k-1|k-1], p[k-1], u[k-1])T_s$. The nonlinear model $\dot{x}=f(x, p, u)$ is linearized 510 and discretized 512 based on the sensed step k−1 values to obtain the discrete linear system form given as:

$$x(k+1)=A(k)x(k)+B(k)u(k)+G(k)w(k); \text{ and}$$

$$y_m(k)=Cm(k)x(k)+z(k)$$

where A, B, C and G are matrices and w and z are noise.

For correction, Q and R are used as the covariance matrices for the process noise w and measurement noise z respectively. P is an estimation error covariance matrix. The following equations correct the predicted states to obtain the state values of $\hat{x}[k|k]$:

$$e(k)=y_m(k)-\hat{y}_m(k|k-1);$$

$$M(k)=P(k|k-1)C_m(k)'(C_m(k)P(k|k-1)C_m(k)'+R(k))^{-1};$$

$$\hat{x}(k|k)=\hat{x}(k|k-1)+M(k)e(k); \text{ and}$$

$$P(k|k)=(I-M(k)C_m(k))P(k|k-1).$$

Where:
e is error between the prediction and the actual measurements, and is used to correct the state predictions;
M is Kalman filter correction feedback gain;
M*e is a quantity that corrects the state prediction to get the corrected state estimates;
P is an estimation covariance matrix;
C is a matrix that relates the system state (x) to system output (y);

R is measurement error covariance matrix that characterizes how "noisy" the measurements are; and
I is an identity matrix where all elements are zero and only the diagonal elements are 1.

The state values are projected such as through the LTV MPC approach where variations are processed 506 through the thermal model by the thermal model submodule 412 to obtain various projected versions of the inputs 300. The results are optimized through optimizer module 414. The optimizer module 414 ensures the projection of variations based on the thermal model are selected in a systematic way. For example, the optimization strategy may be preselected based on the thermal model and objectives for the thermal system 100 and the propulsion system 102. The optimizer module 414 may use a cost function minimization approach. For example, the optimal solution ultimately selected may be one that minimizes the error between the desired temperature and the projected temperature of variation. Also, using the cost function, the optimizer module 414 may minimize system fluctuations by minimizing the amount a valve setting is changed in any given control step because large valve movements would have more significant side effects such as impacts on other system temperatures. The cost function includes terms ensuring that minimization of both is considered, for example, where the sum of the error and of the system fluctuations is minimized. The processing 506 is initialized at t=k−1 and the optimization procedure is executed using the inputs to find the optimized option over the time horizon t=k to find the solution 514 that best meets the optimization objectives. The solution with the smallest cost function may be determined to give the optimal solution. At the next step of the control approach, the prediction horizon k is shifted one ΔT and another optimization is executed. Accordingly the controlled states 305 are reassessed over each time step.

Constraints such as the physical limitations of the actuators 139, 155, 143 and/or the valves 138, 154, 142 and flow saturation rates of the coolant system 115 are factored such that the optimization is not unbounded but instead is kept within prescribed limits. Other constraints may be included, such as desired system performance factors, which may include avoiding overtemperature of the coolant and optimizing operational efficiency. Weighting may be factored such as protecting the engine over delivering cabin comfort. Each controlled parameter is optimized in coordination with the other controlled parameters without violating the constraints. Accordingly, constrained optimization is accomplished so that the optimization solution 514 is accomplished over the time horizon while satisfying for constraints and balancing the thermal system to stay within the constraints 516. Accordingly, the system flow requests are met within constraints. The multivariable control module delivers the inputs 300 at t=k, in the form of pump flow rate 301, block valve effective flow area 302, radiator valve effective flow area 303, and transmission valve effective flow area 304.

The inverse flow model 256 converts 518 the t=k inputs to the actuator states 305 by processing the inputs through an inverse of the flow model 252. The states 305 are output 520 and include speed 306 of the main coolant pump 120, actuator position 308 of the block valve 138, actuator position 310 of the radiator valve 154, and actuator position 312 of the transmission valve 142. The actuators are controlled 522 to operate the pump 120 at the optimal speed and to move the valves 138, 154, 142 to provide the optimal effective flow areas. In a number of embodiments, other state values are used, such as for purposes of controlling 522 the propulsion system 102. For example, a projected $T_{wall}$ value may be used to control combustion by controlling the actuators of the fuel injectors 226, throttle valve 228, EGR valve 230, VGT actuator 234 and cam phaser 236.

Accordingly, actuators are operated optimally for enhanced thermal management. In a number of embodiments, methods for determining a thermal state include estimating system branch flow based on a flow model and actuator feedback. A thermal model may be used to provide state prediction and linearized model parameters. Predictive control may be used including with real time constraint optimization to provide effective control. The results coordinate various actuators to satisfy system requests while optimizing for overall system performance. In an example, initiating cabin heating through the HVAC system 96 will result in opening of the heater valve 150 directing flow through the heater cores 123, 124 and as a result, cooling the coolant that circulates therethrough. The reduction in flow and the reduction in temperature in other branches of the overall flow and heat balance of the thermal system 100 results in changes in the outcomes of the thermal model processing 506. The control structure 400 calculates the new flows and projects versions of the thermal model results into the future. A constrained optimal projection is determined based on the cost function to achieve the desired system temperatures. The t=k control states are selected from the optimal projection and used to position the controlled actuators. As a result of the new flow through the heater valve 150, as well as the flows through the other system valves are rebalanced to achieve the desired system temperatures. The thermal management system 84 uses both flow models and thermal models to provide a fully coordinated understanding of the impacts of any given dynamic. Controlling to effective valve area provides an accurate representation of how changes in actuator position will influence flow. Effective valve areas are controlled along with pump speed to minimize the MPC cost function. The thermal system 100 is controlled to deliver optimal efficiency, such as by keeping the engine 104 at optimal $T_{wall}$ temperature, to protect components, and to deliver passenger comfort.

In one implementation, the thermal system 100 comprises the internal combustion engine 104, the radiator 122, the transmission 106 with the transmission oil heat exchanger 128 and a coolant system 115 for distributing a coolant flow including through the engine 104, the radiator 122 and the transmission oil heat exchanger 128. The block valve 138 controls the coolant flow through the engine's block 108. The radiator valve 154 controls the coolant flow through the radiator 122. The transmission valve 142 controls the coolant flow through the transmission oil heat exchanger 128. The main coolant pump 120 circulates the flow throughout the coolant system 115. The controller 204, using the flow and thermal models, determines an effective flow areas of each of the valves 138, 154, 142 and determines a speed of the pump 120, wherein the effective flow areas and the speed deliver an amount of the coolant flow through each of the engine 104, radiator 122 and transmission oil heat exchanger 128 that result in a desired wall temperature of the engine 104, a desired temperature of the coolant leaving the radiator 122, and a desired temperature of the transmission 106. The effective area of the valves 138, 154, 142 and the speed of the pump 120 are determined together in coordination to optimize the desired outcomes.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A thermal management system, comprising:
   a thermal system including fluid conduits;
   a sensor disposed to monitor an input parameter state of the thermal system;
   an actuator configured to vary a flow in the fluid conduits; and
   a controller configured to:
      receive, from the sensor, a signal representative of the input parameter state;
      process an actuator state through a flow model of the thermal system to obtain an existing flow in the fluid conduits;
      process the existing flow through a thermal model of the thermal system to determine an input that reduces an error between a desired parameter state and the input parameter state;
      process the input through an inverse flow model to convert the input to a desired actuator state; and
      position the actuator in the desired actuator state.

2. The system of claim 1, wherein the controller is configured to calculate a cost function where the cost function includes a sum of the error between the desired parameter state and the input parameter state plus an amount a position of the actuator is projected to change in a next control step.

3. The system of claim 2, wherein the controller is configured to select a version of the input from a group of projected inputs, wherein the version has the cost function minimized.

4. The system of claim 2, wherein the controller is configured to constrain the input within a range.

5. The system of claim 4, wherein the range is selected to reflect physical limitations of the thermal management system and thermal management system performance factors.

6. The system of claim 1, comprising an internal combustion engine, wherein the controller is further configured to control operation of an internal combustion engine.

7. The system of claim 6, wherein the sensor is configured to monitor a coolant temperature of a coolant in the fluid conduits, and wherein the controller is configured to determine, using the coolant temperature, a wall temperature of the internal combustion engine.

8. The system of claim 1, comprising at least one valve configured to control the flow through branches of the fluid conduits, wherein the input parameter state comprises a position of the valve, wherein the controller is configured to determine, based on the position of the valve, the flow in the branches.

9. The system of claim 1, wherein the thermal system comprises an internal combustion engine, a radiator, and a coolant system for distributing the flow including through the engine, the radiator and the transmission oil heat exchanger, the system comprising:
   a first valve for controlling the flow through the engine;
   a second valve for controlling the flow through the radiator; and a pump for circulating the flow,
wherein the controller is configured to:
determine an effective flow area of each of the first and second valves and a speed of the pump that together deliver an amount of the flow through each of the engine and the radiator, wherein the effective flow areas and the speed result in a desired wall temperature of the engine, and a desired temperature of the coolant leaving the engine.

10. The system of claim 9 comprising a transmission with a transmission oil heat exchanger and a third valve for controlling the flow through the transmission oil heat exchanger, wherein the controller is configured to determine an effective flow area of the third valve that results in a desired temperature of the transmission.

11. A method of controlling a thermal system with fluid conduits, the method comprising:
receiving, by at least one controller and from at least one sensor, at least one signal representative of at least one initial state of at least one input parameter of the thermal system;
processing, by the controller and through a flow model of the thermal system, a state of at least one actuator that varies a flow in the fluid conduits, to obtain at least one existing flow in the thermal system;
processing, by the controller and through a thermal model of the thermal system, the existing flow to determine an input that reduces an error between a desired state of the at least one input parameter state and the initial state;
processing, by the controller and through an inverse flow model, the input to convert the input to a desired state of the at least one actuator;
operating, by the controller, the actuator to position the actuator into the desired actuator state.

12. The method of claim 11, comprising:
calculating, by the controller, a cost function where the cost function includes a sum of the error between the desired state and the initial state plus an amount a position of the actuator is projected to change in a next control step.

13. The method of claim 12, comprising selecting, by the controller, a version of the input from a group of projected inputs, wherein the version has the cost function minimized.

14. The method of claim 12, comprising constraining, by the controller, the input to within a range.

15. The method of claim 14, comprising selecting the range to reflect physical limitations of the thermal management system and thermal management system performance factors.

16. The method of claim 11, comprising controlling, by the controller, operation of an internal combustion engine.

17. The method of claim 16, comprising:
monitoring, by the sensor, a coolant temperature of a coolant in the thermal system; and
determining, by the controller using the coolant temperature, a wall temperature of the internal combustion engine.

18. The method of claim 11, comprising:
controlling, by at least one valve, a flow through the thermal system; and
determining, by the controller and based on the state of the actuator, flow through the valve.

19. The method of claim 11, comprising linearizing and discretizing the thermal model to obtain the discrete linear system form, prior to processing the thermal model.

20. A vehicle comprising:
a thermal system including an engine, a radiator, and a coolant system coupled with the engine and the radiator;
a first valve disposed in the coolant system to modulate a first flow through the engine, the first valve operated by a first actuator;
a second valve disposed in the coolant system to modulate a second flow through the radiator, the second valve operated by a second actuator;
a pump disposed in the coolant system to circulate a main flow, the pump operated by a third actuator;
a number of sensors each generating signals representative of at least one initial state of at least one parameter of the thermal system; and
a controller configured to:
process the signals, an initial first actuator state, an initial second actuator state, and an initial third actuator state through a flow model of the thermal system to determine a rate of the first flow through the engine and the second flow through the radiator, and to determine a speed of the pump;
determine an effective flow area of each of the first and second valves and a speed of the pump;
process, through a thermal model of the thermal system, the rates of flow through the engine and the radiator and the speed of the pump to determine inputs that together deliver a flow amount through each of the engine and the radiator that result in a desired wall temperature of the engine, and a desired temperature of the coolant leaving the radiator;
process the inputs through an inverse flow model to convert the inputs to the desired states of the first, second and third actuators; and
position the actuators into their desired states.

* * * * *